United States Patent
Zhang et al.

(10) Patent No.: US 8,392,739 B2
(45) Date of Patent: Mar. 5, 2013

(54) MULTI-CORE PROCESSOR, ITS FREQUENCY CONVERSION DEVICE AND A METHOD OF DATA COMMUNICATION BETWEEN THE CORES

(75) Inventors: Ge Zhang, Beijing (CN); Weiwu Hu, Beijing (CN)

(73) Assignee: Loongson Technology Corporation Limited, Beijing (CN)

( * ) Notice: Subject to any disclaimer, the term of this patent is extended or adjusted under 35 U.S.C. 154(b) by 426 days.

(21) Appl. No.: 12/680,163

(22) PCT Filed: Aug. 5, 2008

(86) PCT No.: PCT/CN2008/001424
§ 371 (c)(1), (2), (4) Date: Mar. 25, 2010

(87) PCT Pub. No.: WO2009/043225
PCT Pub. Date: Apr. 9, 2009

(65) Prior Publication Data
US 2010/0235672 A1  Sep. 16, 2010

(30) Foreign Application Priority Data
Sep. 28, 2007  (CN) .......................... 2007 1 0175336

(51) Int. Cl.
*G06F 1/12* (2006.01)
*G06F 1/04* (2006.01)
*G06F 15/163* (2006.01)

(52) U.S. Cl. ......... 713/400; 713/375; 713/500; 713/600

(58) Field of Classification Search .................. 713/300, 713/310, 320–324, 330, 340, 375, 400–401, 713/500–502, 600
See application file for complete search history.

(56) References Cited

U.S. PATENT DOCUMENTS

| | | | |
|---|---|---|---|
| 4,523,274 A * | 6/1985 | Fukunaga et al. | 710/107 |
| 5,841,988 A * | 11/1998 | Chennubhotla et al. | 709/237 |
| 6,963,986 B1 | 11/2005 | Briggs et al. | |

FOREIGN PATENT DOCUMENTS

| | | |
|---|---|---|
| CN | 1661512 A | 8/2005 |
| CN | 101135929 | 3/2008 |
| EP | 1585011 | 10/2005 |
| KR | 20070071352 | 7/2007 |

OTHER PUBLICATIONS

Chandra et al. "Dynamically Optimized Synchronous Communication for Low Power System on Chip Designs"; IEEE, Computer Society; 134-139 (2003).

* cited by examiner

*Primary Examiner* — Fahmida Rahman
(74) *Attorney, Agent, or Firm* — Occhiuti Rohlicek & Tsao LLP

(57) ABSTRACT

A multi-core processor and a frequency conversion device thereof as well as a method of communication between the cores are disclosed. Each processor core of the multi-core processor includes a frequency conversion device, which includes a multi-bit state changing means, a multiple selector, a frequency conversion coefficient register, a multi-input OR gate and a clock-gating circuit unit. A common original clock is sent to the frequency conversion device of each processor core at work. The frequency conversion device real-timely reads the value of the frequency conversion coefficient register of a corresponding processor core and receives data transmission valid signals from other processor cores. By gating the common original clock, a frequency conversion function of the processor core is completed. In the invention, the dynamic frequency conversion function of a multi-core processor is achieved, the frequency conversion coefficient control may be performed by each processor core independently, and a highly effective synchronous communication may be maintained between the processor cores, so as to reduce the overall running consumption of the processor and save power on different processor cores of the multi-core processor or on different IP modules in SOC.

12 Claims, 5 Drawing Sheets

MULTI-CORE PROCESSOR, ITS FREQUENCY CONVERSION DEVICE AND A METHOD OF DATA COMMUNICATION BETWEEN THE CORES

CROSS-REFERENCE TO RELATED APPLICATIONS

This application is the National Stage of International Application No. PCT/CN2008/001424, filed on Aug. 5, 2008, which claims the benefit of Chinese Application Serial No. 200710175336.1, filed on Sep. 28, 2007. The contents of both of the foregoing applications are hereby incorporated by reference in their entirety.

FIELD OF THE INVENTION

The present invention relates to the technical field of multi-core processors, and more particularly, to a multi-core processor, a frequency conversion device thereof as well as a method of communication between the cores.

BACKGROUND OF THE INVENTION

In the design of processor chips, power consumption has become another important technical index in succession to the processor performance. The design of a low-consumption processor is in great demand and will be widely applied whether in the field of general-purpose processors or embedded processors.

Since the power consumption of a processor is in direct ratio to the clock frequency of the processor, dynamically altering the frequency of a processor according to requirements of the running programs during the running of the processor has become an effective measure for reducing the power consumption of a processor.

Multi-core processors have become an important trend in processor development. In a multi-core processor, each processor core real-timely adjusts the frequency according to its loading and different demands so that it can reduce the power consumption effectively.

In the prior art, one situation is that all the processor cores in a multi-core processors use the same clock and thus all the processor cores must be adjusted together during frequency adjustment. But, in this way, the power consumption of the all processors can be reduced only to a limited extent.

Another situation is that each processor core uses a different clock, so that each processor core may dynamically adjust the frequency according to its condition, thereby better saving the power consumption of the processor. But, because the processor cores adopt different clock frequencies, the data communication between a processor core and another can only be an asynchronous clocks communication, thereby influencing the efficiency of data exchange and communication between the processor cores and degrading the overall performance of the processor.

SUMMARY OF THE INVENTION

In order to solve the problems existing in the prior art, the present invention provides a multi-core processor, a frequency conversion device thereof, and a method of communication among a plurality of processor cores of the multi-core processor, wherein the method supports the dynamic reduction of clock frequencies in a multi-core processor and maintains a clock synchronous communication between a processor core and another.

In order to achieve the object of the present invention, a multi-core processor comprising a plurality of processor cores is provided. A synchronous communication is performed among the plurality of processor cores. Each the state changing means is adapted to output the data of a plurality of frequency conversion coefficients to the multiple selector, an output of the state changing means being connected to a data input of the multiple selector;

the frequency conversion coefficient register is adapted to store the current frequency conversion coefficient of the processor core, and its output is connected to a selection input of the multiple selector;

the multi-input OR gate is adapted to receive the output obtained by the multiple selector according to the state changing means and the frequency conversion coefficient register and receive data valid bits which are sent from other processor cores to the processor core, and to change its output state into a valid state and send a gating signal to the clock-gating circuit unit; and the clock-gating circuit unit is adapted to receive a common original clock of the processor core as its clock input and receive the gating signal output by the multi-input OR gate as its gating enable input, the output clock being the common original clock.

The state changing means includes a multi-bit register and the corresponding state conversion logic, and each bit of the multi-bit register separately corresponds to a frequency conversion coefficient independently; and the state conversion logic forms an electrical signal waveform according to the corresponding value of the multi-bit register, outputs the corresponding valid bit and determines the corresponding frequency conversion coefficient.

The clock-gating circuit unit includes a 2-input AND gate.

The clock-gating circuit unit further includes a latch or register that performs sampling on the falling edge of the clock.

In order to achieve the object of the present invention, a frequency conversion device included in a multi-core processor is further provided. The frequency conversion device comprises a multiple selector and further comprises a state changing means, a frequency conversion coefficient register, a multi-input OR gate and a clock-gating circuit unit, wherein:

the state changing means is adapted to output the data of a plurality of frequency conversion coefficients to the multiple selector, an output of the state changing means being connected to a data input of the multiple selector;

the frequency conversion coefficient register is adapted to store the current frequency conversion coefficient of the processor core, and its output is connected to a selection input of the multiple selector;

the multi-input OR gate is adapted to receive the output obtained by the multiple selector according to the state changing means and the frequency conversion coefficient register and receive data valid bits which are sent from other processor cores to the processor core, and to change its output state into a valid state and send a gating signal to the clock-gating circuit unit; and the clock-gating circuit unit is adapted to receive a common original clock of the processor core as its clock input and receive the gating signal output by the multi-input OR gate as its gating enable input, the output clock being the common original clock.

The state changing means includes a multi-bit register and the corresponding state conversion logic, and each bit of the multi-bit register separately corresponds to a frequency conversion coefficient independently; and the state conversion logic forms an electrical signal waveform according to the corresponding value of the multi-bit register, outputs the corresponding valid bit and determines the corresponding frequency conversion coefficient.

The clock-gating circuit unit includes a 2-input AND gate.

The clock-gating circuit unit further includes a latch or register that performs sampling on the falling edge of the clock.

In order to achieve the object of the present invention, a method of clock synchronous data communication between the processor cores of a multi-core processor is further provided. The multi-core processor comprises a plurality of processor cores, among which a clock synchronous data communication is performed using a frequency conversion device. The frequency conversion device includes a state changing means, a multiple selector, a frequency conversion coefficient register, a multi-input OR gate and a clock-gating circuit unit. The method comprises the following steps:

Step A: a first processor core sends data to a second processor core, the data including a single-bit data valid bit and a multi-bit data content;

Step B: the frequency conversion device of the second processor core receives the data valid bit sent by the first processor core, changes the output state of the multi-input OR gate connected to the data valid bit signal sent by the first processor core into a valid state, and sends the valid state as a new gating signal to the clock-gating circuit unit thereof; here the gating clock isn't influenced by a frequency conversion coefficient controller, and the output clock changes from a frequency conversion clock to a common original clock; and Step C: the second processor core uses the new clock generated through the change, namely, the recovered common original clock, to sample the data content sent from the first processor core so that the data is correctly sampled in the second processor core in time, thereby guaranteeing the correctness of the synchronous transmission of the data.

The following step is further performed before the Step A:

rewriting the values of the frequency conversion coefficient registers in the frequency conversion devices of the first and second processor cores so that the first and second processor cores each have been operating at a particular clock frequency;

wherein the clock frequency may be a common original clock frequency of the processor or a clock frequency after frequency conversion.

The following step is further performed after the Step C:

after the second processor core receives the data sent from the first processor core completely, changing the data transmission valid bit of the first processor core into an invalid bit, i.e., 0, and controlling the clock-gating circuit in the frequency conversion device of the second processor core by the frequency conversion coefficient register once again, with the result that the clock of the second processor core returns to the former frequency conversion clock for operation.

THE BEST WAY TO CARRY OUT THE PRESENT INVENTION

In order to make the object, technical solution and advantages of the present invention more clear and explicit, the processor as well as the frequency conversion device and the method thereof according to the present invention are further described in detail hereinafter, by way of example, with reference to the accompanying drawings. It should be understood that the examples described here are only used for interpreting the present invention but not for limiting it.

The frequency conversion device of the multi-core processor and the method according to the present invention enable each processor core to operate at a clock frequency lower than the common original clock by controlling the common original clock of the processor.

Figure 1:
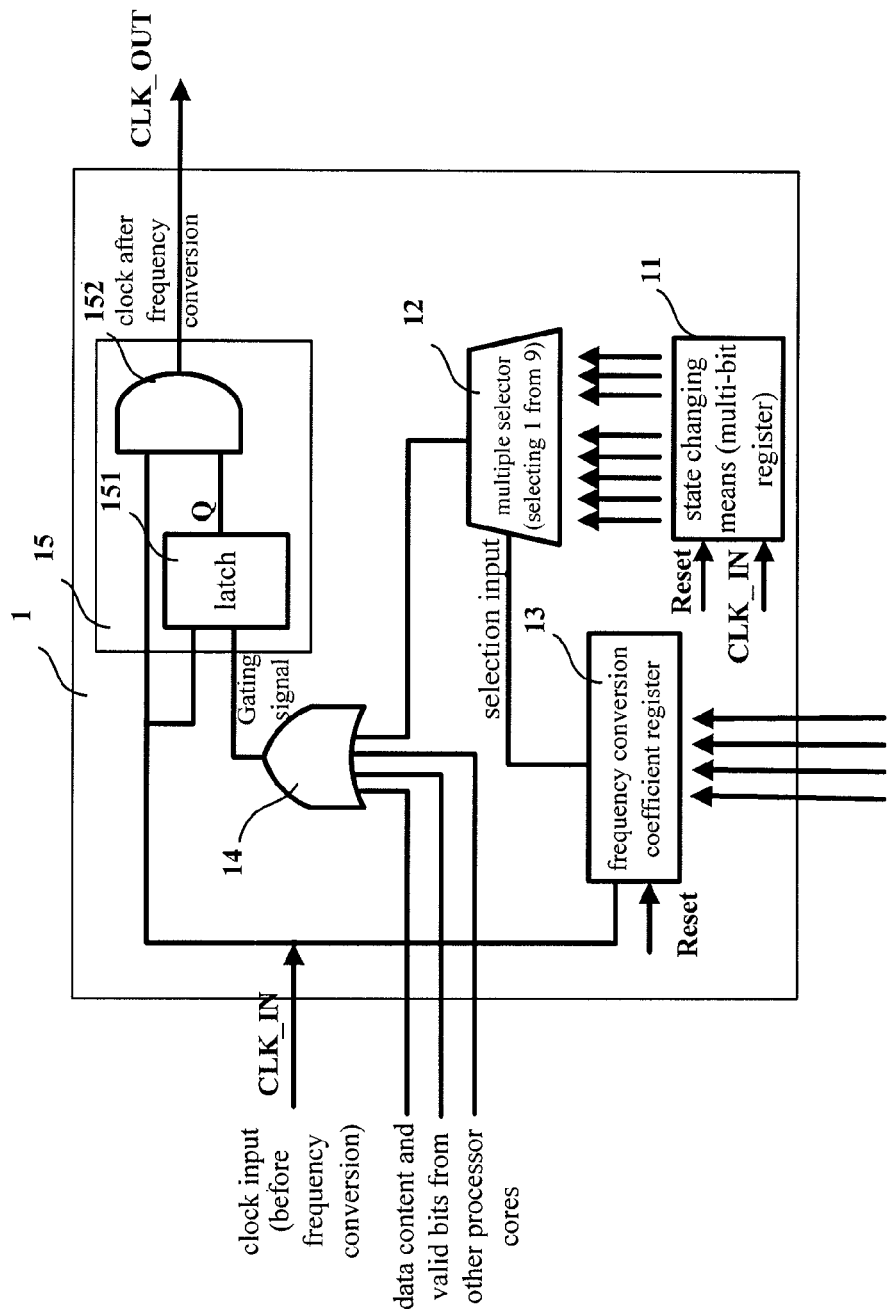
FIG. 1 is a schematic view showing the structure of the frequency conversion device of each processor core in the embodiment of the multi-core processor according to the present invention.
Figure 2:
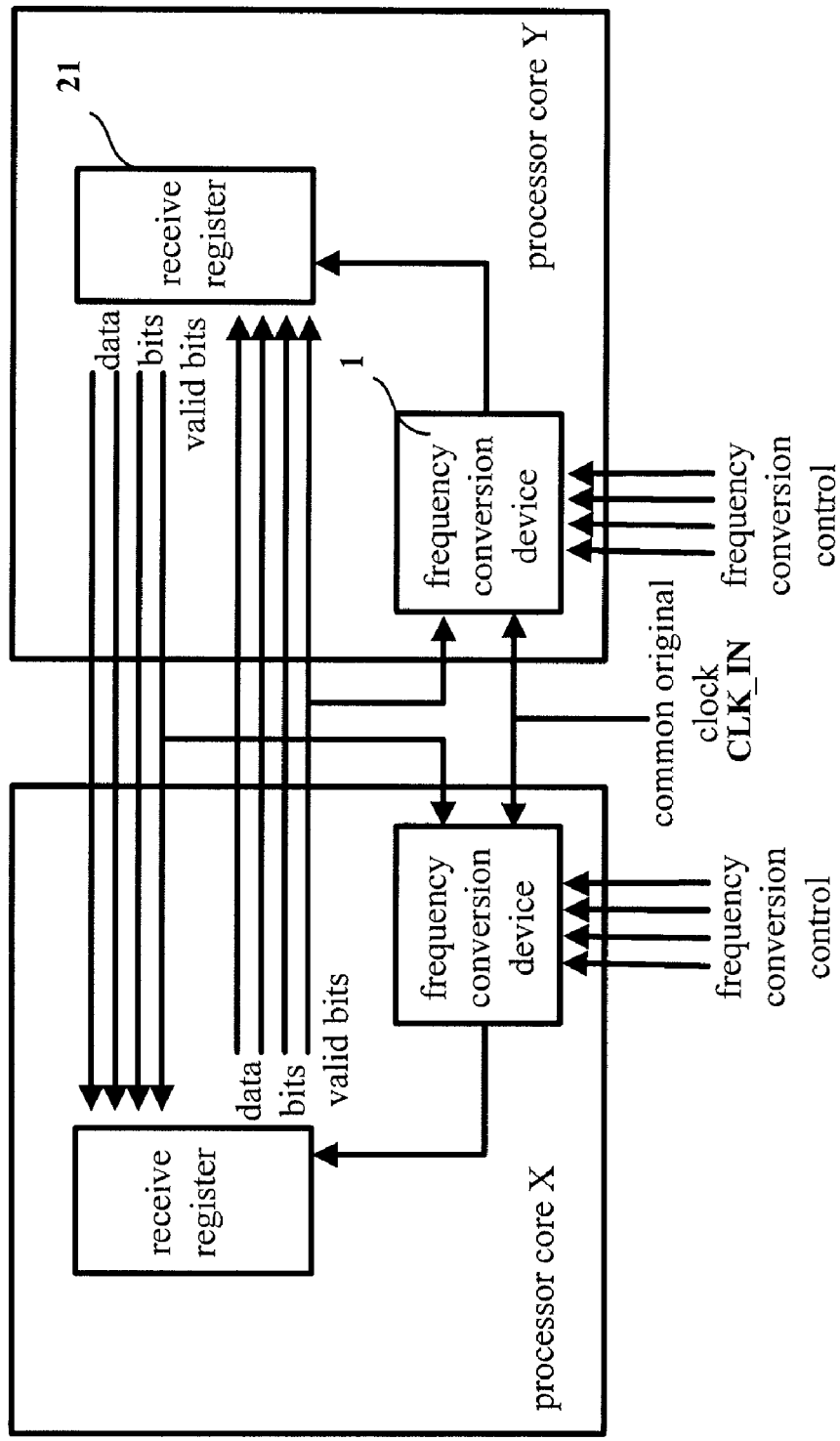
FIG. 2 is a schematic view showing how to connect the frequency conversion devices of two processor cores in need of mutual communication in the embodiment of the multi-core processor according to the present invention.

In order to achieve the above object, the present invention provides a multi-core processor comprising a frequency conversion device 1, as shown in FIG. 1, which includes a state changing means 11, a multiple selector 12, a frequency conversion coefficient register 13, a multi-input OR gate 14 and a clock-gating circuit unit 15, wherein:

the state changing means 11 includes a multi-bit register and the corresponding state conversion logic, and each bit of the multi-bit register separately corresponds to a frequency conversion coefficient independently; and an output of the state changing means 11 is connected to a data input of the multiple selector 12;

the state conversion logic forms an electrical signal waveform according to the corresponding value of the multi-bit register, outputs the corresponding valid bit and determines the corresponding frequency conversion coefficient;

the frequency conversion coefficient register 13 is adapted to store the current frequency conversion coefficient of the processor core, and its output is connected to a selection input of the multiple selector 12;

that is to say, the multiple selector 12 has its data input be connected to the output of the state changing means 11 of the frequency conversion device, and has its selection input be connected to the output of the frequency conversion coefficient register 13;

the multi-input OR gate 14 receives the output of the multiple selector 12 as one of the inputs to it while receiving data valid bits which are sent from other processor cores to the processor core as inputs to it, as shown in FIG. 2; and the clock-gating circuit unit 15 receives a common original clock of the processor core as its clock input while receiving the output of the multi-input OR gate 14 as its gating enable input to control the common original clock.

The clock-gating circuit unit 15 includes a latch 151 (or a register) that performs sampling at the falling edge of the clock and a 2-input AND gate 152. The clock-gating circuit unit 15 receives a common original clock of the processor core as its clock input while receiving the output of the multiple selector 12 as its gating enable input to control the common original clock, and the output of said unit is that clock after frequency conversion.

Preferably, the clock-gating circuit unit 15 includes a negative-edge latch 151 and a 2-input AND gate 152.

The clock-gating circuit unit 15 is a clock-gating circuit in the field of IC design, wherein the function of the negative-edge latch is to avoid the direct transmission of gating signals to the AND gate behind it, so as to prevent the possibility of generating clock-spikes.

When operating, the frequency conversion device 1 in a processor controls its clock output so as to complete such functions as frequency conversion of the common original clock and data synchronization, by receiving the signal valid values of the data requests which are sent from other processor cores to the processor core, based on the value from the frequency conversion coefficient register 13.

The processor may be a multi-core processor or a system on a chip (SOC).

The present invention further provides a method of clock synchronous data communication between a processor core and another in a multi-core processor.

In the embodiment of the present invention, take two processor cores X and Y of a multi-core processor as example to illustrate the method of clock synchronous data communication between the processor cores according to the present invention. It should be appreciated that the method of clock synchronous data communication between the processor cores according to the present invention is also applicable to the case in which there are more than 2 processor cores.

Figure 3:
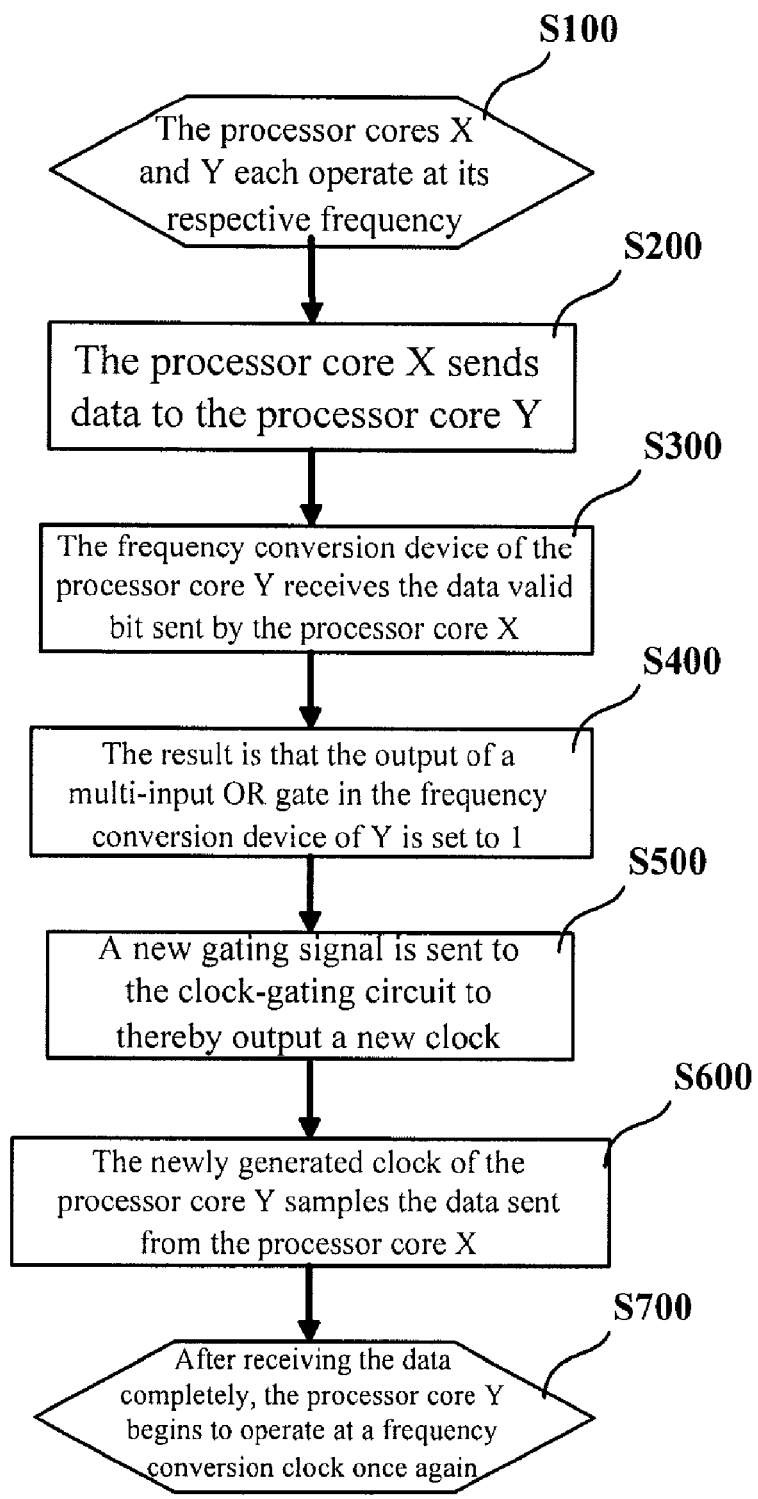
FIG. 3 is a work flow chart where two processor cores operating at different frequencies communicate with each other in the embodiment of the method of clock synchronous data communication between the processor cores of a multi-core processor according to the present invention.
Figure 4:
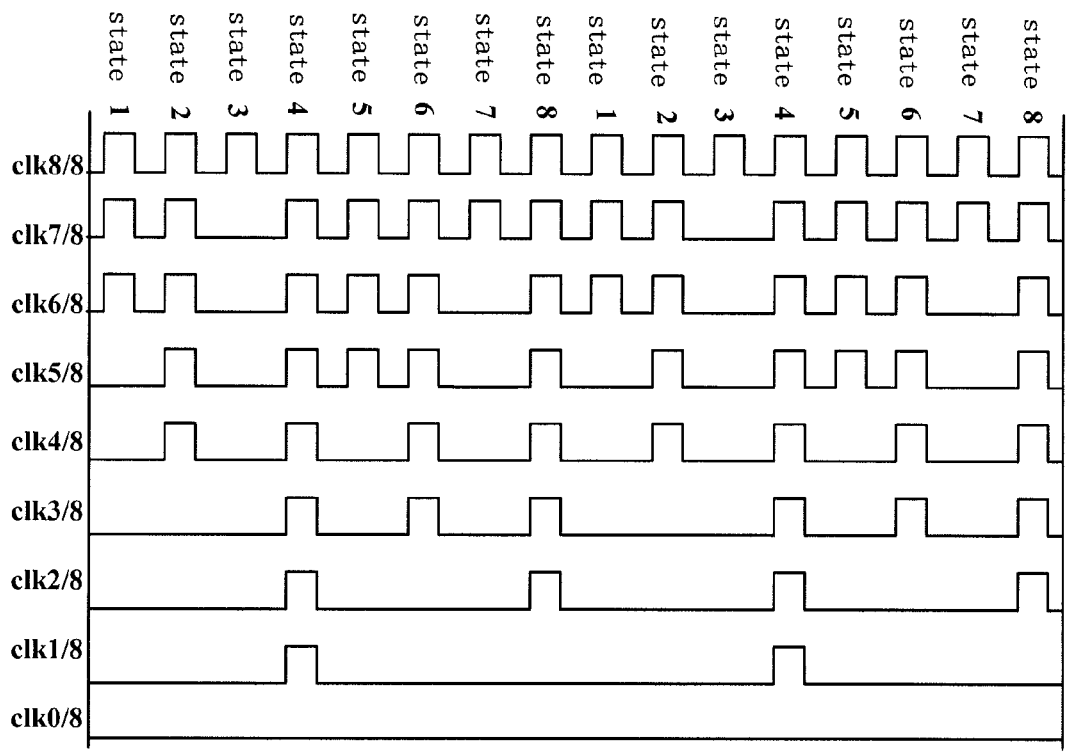
FIG. 4 is a clock output waveform diagram of a frequency conversion device with respect to different frequency conversion coefficients in the embodiment of the method of clock synchronous data communication between the processor cores of a multi-core processor according to the present invention.
Figure 5:
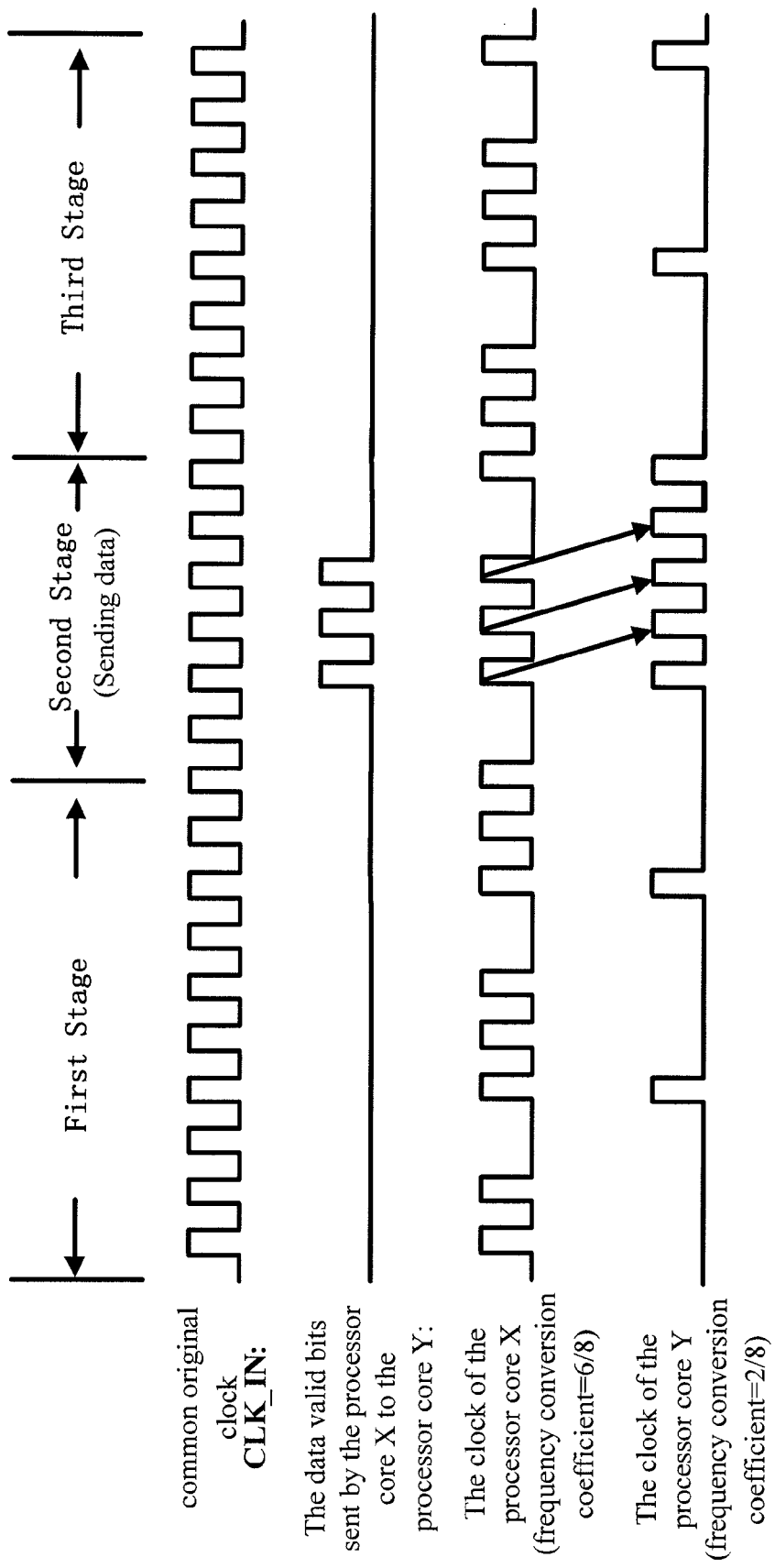
FIG. 5 is an output clock waveform diagram of a processor core Y in communication with a processor core X in the embodiment of the method of clock synchronous data communication between the processor cores of a multi-core processor according to the present invention.

As shown in FIG. 3 in conjunction with FIG. 4 and FIG. 5, the process of communication between the processor cores with different clock frequencies in the present invention is described in detail. The method comprises the following steps.

Step S100: Take the processor core X which is ready to send data to the processor core Y for example, wherein the processor cores X and Y each operate at its respective clock frequency at first; and the clock frequencies may be a common original clock frequency or a clock frequency after frequency conversion, wherein the clock frequency after frequency conversion is controlled by the value of the frequency conversion coefficient register 13.

In the embodiment of the present invention, as a feasible manner, the frequency conversion coefficient register 13 in the frequency conversion device may designate 9 frequency conversion coefficients, respectively representing that the frequency conversion clock works at a speed 0/8 (i.e. no clock), 1/8, 2/8, 3/8, 4/8, 5/8, 6/8, 7/8, 8/8 (i.e. the frequency of the common original clock isn't converted), times the common original clock. FIG. 4 shows a clock output waveform diagram corresponding to different frequency conversion coefficients. As shown in FIG. 4, in the case of a frequency conversion coefficient i/8 (i=0, 1, 2, 3, 4, 5, 6, 7 or 8), during a period of every 8 original clocks, the new frequency conversion clock only outputs i rising edge(s) of clock. That means the clock frequency becomes i/8 of the common original clock frequency. Accordingly, the average running speed of the processor becomes the original i/8, too. Since the consumption of the processor is simply in direct ratio to the frequency thereof, the consumption of the processor becomes the original i/8 likewise.

In the embodiment of the present invention, given that the common original clock frequency of the processor is f, the processor core X will operate at a frequency of (6/8)*f, the processor core Y will operate at a frequency of (2/8)*f, and the clock waveforms of X and Y are shown in the first stage of FIG. 5.

Step S200: The processor core X sends a piece of data to the processor core Y, wherein the data includes a single-bit data valid bit and a multi-bit data content.

Step S300: The frequency conversion device of the processor core Y firstly receives the data valid bit sent by the processor core X.

Step S400: According to the data valid bit, the frequency conversion device changes the output state of the multi-input OR gate 14 connected to it into 1, namely, a valid output state.

Step S500: The output of the multi-input OR gate 14 is sent as a new gating signal to the clock-gating circuit; here, the gating clock isn't influenced by the frequency conversion coefficient, and the output clock changes into the initial common original clock. The current clock waveform of Y is shown in the second stage of FIG. 5.

Step S600: The processor core Y uses the new clock generated through the change to sample the data content sent from the processor core X so that the data is correctly sampled in the processor core Y in time and sent to the receive register 21 of the processor core Y, thereby guaranteeing the correctness of the synchronous transmission of the data.

Step S700: After the processor core Y receives the data sent from the processor core X completely, the data transmission valid bit of X is changed into an invalid bit, i.e., 0, and the gating clock in the frequency conversion device of the processor core Y is controlled by the frequency conversion coefficient register 13 once again, with the result that the clock of the processor core Y returns to the former frequency conversion clock for operation. The clock waveform of Y here is shown in the third stage of FIG. 5.

As shown in FIG. 5, the processor core X with a clock frequency of (6/8)*f sends data to the processor core Y with a clock frequency of (2/8)*f for three times, continuously, thus all the data valid bits are 1 in 3 continuous clock periods. During the sequent 3 clock periods after X sends the data valid signal, the follow-up clock of the processor core Y automatically rises from the lower frequency of (2/8)*f to a clock frequency which is continuously valid every beat, so as to ensure that the data sent from the processor core X can be synchronously sampled in the processor core Y in time, and that the performance and correctness of the transmission process is not influenced by the frequency conversion of clock.

The frequency conversion device of a multi-core processor and the method thereof according to the present invention can overcome the drawbacks of the methods for frequency conversion of clock in a multi-core processor existing in the prior art, are so easy to use that a processor can control the operating frequency of each processor core dynamically according to the task load condition, and meanwhile guarantee a highly-efficient communication among processor cores so as to achieve an effect of reducing the consumption of a multi-core processor while ensuring its performance. Moreover, the frequency conversion device of a multi-core processor according to the present invention is easy to put into practice and easy to use, for the frequency conversion control of clock can be accomplished only using an ordinary digital logic circuit.

Based on the above descriptions of the examples of the present invention in conjunction with the accompanying drawings, the other aspects and characteristics of the present invention are obvious to those skilled in the art.

The examples of the present invention have been described and illustrated hereinbefore. These examples should be considered illustrative only and but not used for limiting the present invention. The present invention should be interpreted according to the appended claims.

Industrial Applicability

By means of the multi-core processor and its frequency conversion device as well as the method of communication among a plurality of processor cores of the multi-core processor according to the present invention, dynamic frequency conversion of a multi-core processor can be achieved, wherein each processor core of the processor can operate at a different clock frequency according to its different frequency conversion coefficient setting, and it can be ensured that data is sampled synchronously during data communication between a processor core and another, so no particular asynchronous clocks communication logic is needed, thereby not only guaranteeing the correctness and speediness of data communication among the processor cores of a multi-core processor but also reducing the consumption of the processor reasonably.

What is claimed is:

1. A multi-core processor comprising a plurality of processor cores among which a synchronous communication is performed, characterized in that each processor core includes a frequency conversion device, which comprises a multiple selector and further comprises a state changing means, a frequency conversion coefficient register, a multi-input OR gate and a clock-gating circuit unit, wherein: the state changing means is adapted to output data of a plurality of frequency conversion coefficients to the multiple selector, an output of the state changing means being connected to a data input of the multiple selector; the frequency conversion coefficient register is adapted to store the current frequency conversion coefficient of the processor core, and its output is connected to a selection input of the multiple selector; the multi-input OR gate is adapted to receive the output obtained by the multiple selector according to the state changing means and the frequency conversion coefficient register and receive data valid bits which are sent from other processor cores to the processor core, and to change its output state into a valid state and send a gating signal to the clock-gating circuit unit; and the clock-gating circuit unit is adapted to receive a common original clock of the processor core as its clock input and receive the gating signal output by the multi-input OR gate as its gating enable input, the output clock being the common original clock.

2. The multi-core processor according to claim 1, wherein the state changing means includes a multi-bit register and the corresponding state conversion logic, each bit of the multi-bit register separately corresponding to a frequency conversion coefficient independently, and the state conversion logic forming an electrical signal waveform according to the corresponding value of the multi-bit register, outputting the corresponding valid bit and determining the corresponding frequency conversion coefficient.

3. The multi-core processor according to claim 1, wherein the clock-gating circuit unit includes a 2-input AND gate.

4. The multi-core processor according to claim 1, wherein the clock-gating circuit unit further includes a latch or register that performs sampling on the falling edge of the clock.

5. A frequency conversion device of a processor core comprising a multiple selector, characterized in further comprising a state changing means, a frequency conversion coefficient register, a multi-input OR gate and a clock-gating circuit unit, wherein: the state changing means is adapted to output data of a plurality of frequency conversion coefficients to the multiple selector, an output of the state changing means being connected to a data input of the multiple selector; the frequency conversion coefficient register is adapted to store the current frequency conversion coefficient of the processor core, and its output is connected to a selection input of the multiple selector; the multi-input OR gate is adapted to receive the output obtained by the multiple selector according to the state changing means and the frequency conversion coefficient register and receive data valid bits which are sent from other processor cores to the processor core, and to change its output state into a valid state and send a gating signal to the clock-gating circuit unit; and the clock-gating circuit unit is adapted to receive a common original clock of the processor core as its clock input and receive the gating signal output by the multi-input OR gate as its gating enable input, the output clock being the common original clock.

6. The frequency conversion device according to claim 5, wherein the state changing means includes a multi-bit register and the corresponding state conversion logic, each bit of the multi-bit register separately corresponding to a frequency conversion coefficient independently, and the state conversion logic forming an electrical signal waveform according to the corresponding value of the multi-bit register, outputting the corresponding valid bit and determining the corresponding frequency conversion coefficient.

7. The frequency conversion device according to claim 5, wherein the clock-gating circuit unit includes a 2-input AND gate.

8. The frequency conversion device according to claim 5, wherein the clock-gating circuit unit further includes a latch or register that performs sampling on the falling edge of the clock.

9. A method of clock synchronous data communication between processor cores of a multi-core processor, the multi-core processor comprising a plurality of processor cores among which a clock synchronous data communication is performed using a frequency conversion device included in each processor core, wherein the frequency conversion device includes a state changing means, a multiple selector, a frequency conversion coefficient register, a multi-input OR gate and a clock-gating circuit unit, the method comprising the following steps: Step A, in which a first processor core sends data to a second processor core, the data including a single-bit data valid bit and multi-bit data content; Step B, in which the frequency conversion device of the second processor core receives the data valid bit sent by the first processor core, changes the output state of the multi-input OR gate to which it is connected into a valid state, and sends the valid state as a new gating signal to the clock-gating circuit unit thereof, the output clock changing from a frequency conversion clock to a common original clock; and Step C, in which the second processor core uses the common original clock to sample the data content sent from the first processor core.

10. The method of data communication according to claim 9, wherein the following step is further performed before Step A: rewriting the values of the frequency conversion coefficient registers in the frequency conversion devices of the first and second processor cores so that the first and second processor cores each operate at a set clock frequency.

11. The method of data communication according to claim 10, wherein the clock frequency is a common original clock frequency of the processor or a clock frequency after frequency conversion.

12. The method of data communication according to claim 9, wherein the following step is further performed after Step C: after the second processor core receives the data sent from the first processor core completely, changing the data transmission valid bit of the first processor core into an invalid bit, and controlling the clock-gating circuit in the frequency conversion device of the second processor core by the frequency conversion coefficient register once again.

* * * * *